(12) United States Patent
Alfano et al.

(10) Patent No.: US 10,023,295 B2
(45) Date of Patent: Jul. 17, 2018

(54) AIRCRAFT INCLUDING A FUSELAGE SPONSON

(71) Applicant: AIRBUS HELICOPTERS, Marignane (FR)

(72) Inventors: David Alfano, Aix en Provence (FR); Guillaume Legras, Saint Chamas (FR); Jean Nicola, Vitrolles (FR)

(73) Assignee: AIRBUS HELICOPTERS, Marignane (FR)

( * ) Notice: Subject to any disclaimer, the term of this patent is extended or adjusted under 35 U.S.C. 154(b) by 172 days.

(21) Appl. No.: 15/208,970

(22) Filed: Jul. 13, 2016

(65) Prior Publication Data
US 2017/0113781 A1 Apr. 27, 2017

(30) Foreign Application Priority Data
Jul. 20, 2015 (FR) ...................................... 15 01537

(51) Int. Cl.
*B64C 7/00* (2006.01)
*B64C 1/14* (2006.01)
*B64C 27/04* (2006.01)

(52) U.S. Cl.
CPC .............. *B64C 7/00* (2013.01); *B64C 1/1438* (2013.01); *B64C 1/1461* (2013.01); *B64C 27/04* (2013.01)

(58) Field of Classification Search
CPC ......... B64C 7/00; B64C 27/04; B64C 1/1461; B64C 1/1438
See application file for complete search history.

(56) References Cited

U.S. PATENT DOCUMENTS

| | | | | |
|---|---|---|---|---|
| 2,448,075 | A * | 8/1948 | Bortner | B64C 35/005 114/126 |
| 6,189,833 | B1 * | 2/2001 | Ambrose | B64C 1/1407 244/118.3 |
| 6,290,174 | B1 * | 9/2001 | Gioia | B64C 35/002 244/105 |
| 9,327,828 | B2 * | 5/2016 | Gionta | B64C 21/00 |

(Continued)

FOREIGN PATENT DOCUMENTS

GB 2342635 4/2000

OTHER PUBLICATIONS

French Search Report for French Application No. FR 1501537, Completed by the French Patent Office dated May 24, 2016, 6 Pages.

*Primary Examiner* — Valentina Xavier
(74) *Attorney, Agent, or Firm* — Brooks Kushman P.C.

(57) ABSTRACT

An aircraft having a sponson extending substantially transversely relative to a main body of the fuselage of the aircraft and substantially perpendicularly relative to a vertical anteroposterior plane of symmetry P of the main body of the fuselage when the aircraft is standing on a horizontal support, the sponson including a notch locally reducing a cross-section of the sponson in a connection zone of the sponson, the connection zone being suitable for being arranged in the immediate proximity of the main body of the fuselage of the aircraft from which the sponson emerges transversely, the notch being open at least to a front outside face and to a top outside face of the sponson and being suitable for receiving a bottom portion of a sliding side door when in its open position.

11 Claims, 3 Drawing Sheets

(56) References Cited

U.S. PATENT DOCUMENTS

2006/0255208 A1\* 11/2006 Hawkins ............... B64C 35/00
 244/105
2012/0187242 A1\* 7/2012 Karkow ............... B64C 35/001
 244/105

\* cited by examiner

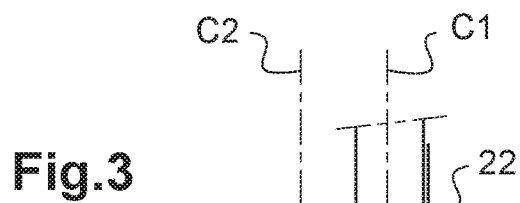
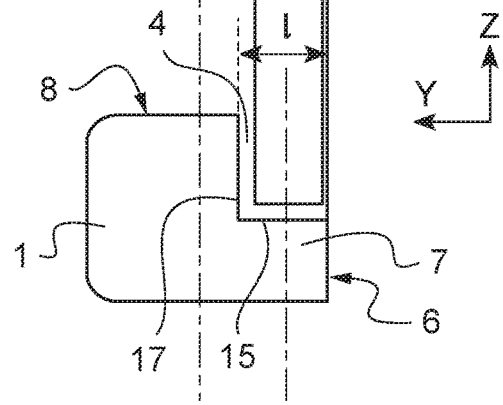
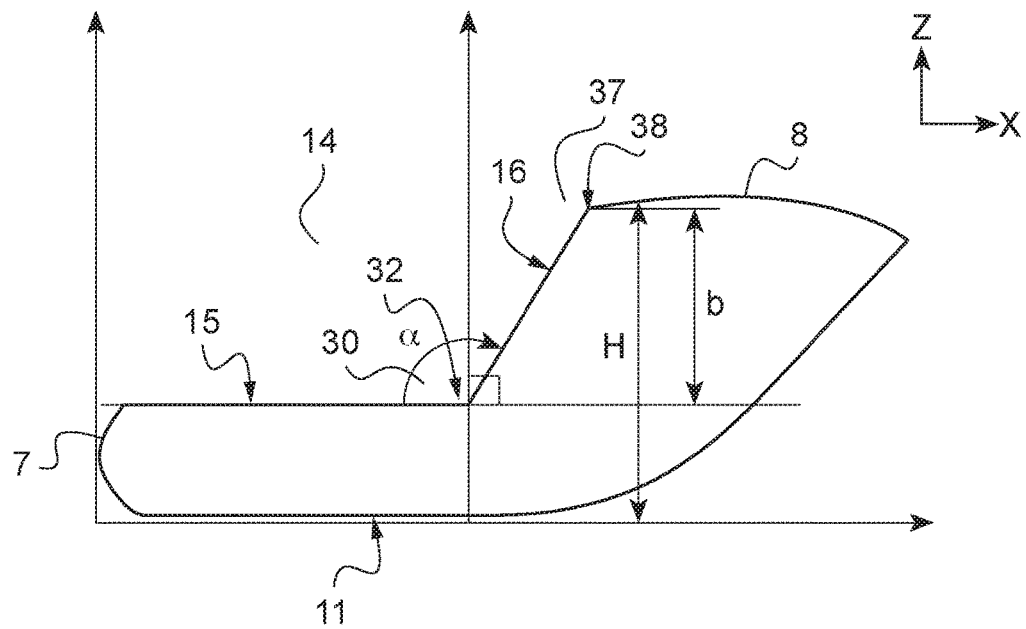

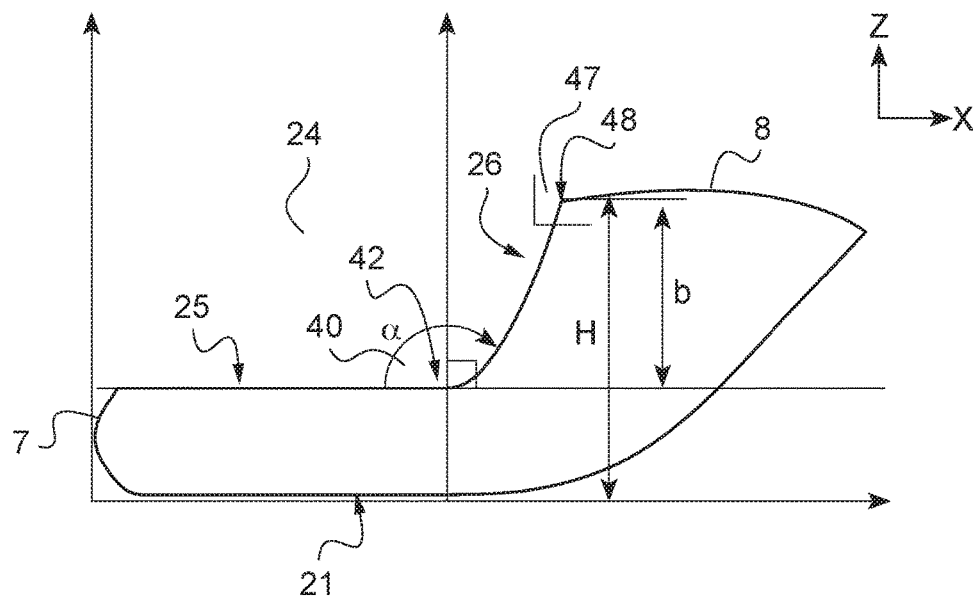
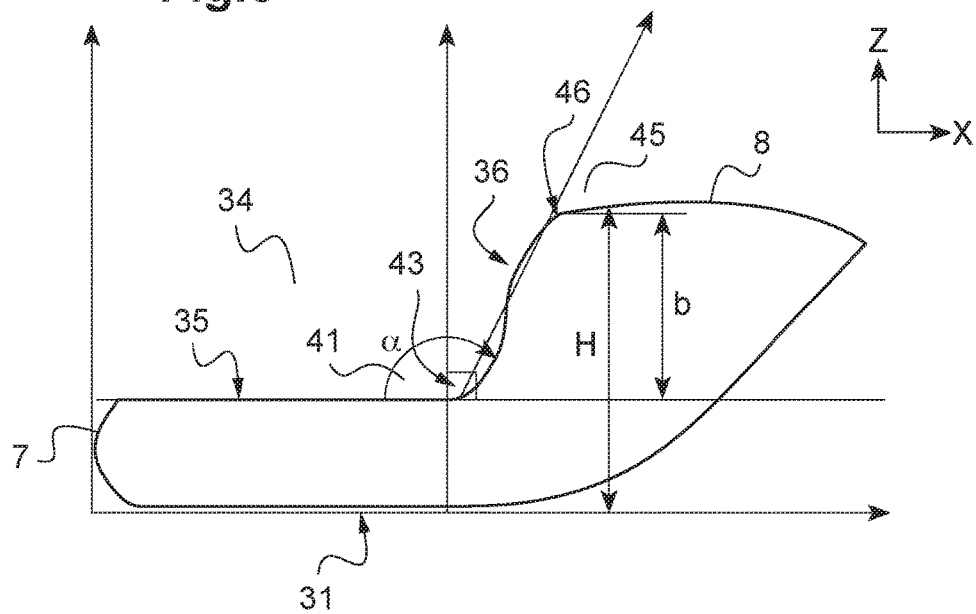

AIRCRAFT INCLUDING A FUSELAGE SPONSON

CROSS REFERENCE TO RELATED APPLICATION

This application claims priority to French patent application No. FR 15 01537 filed on Jul. 20, 2015, the disclosure of which is incorporated in its entirety by reference herein.

BACKGROUND OF THE INVENTION (1) Field of the Invention

The present invention relates to an aircraft fitted with at least one fuselage sponson.

(2) Description of Related Art

As shown in Documents U.S. Pat. No. 2,448,075 or GB 2 342 635, such a fuselage sponson is generally arranged longitudinally on a side flank of a main body of a fuselage. This type of sponson also serves to increase the buoyancy of the aircraft, e.g. for a seaplane, or indeed more generally for housing and protecting equipment of an aircraft.

By way of example, aircraft equipment protected in this way by a sponson may comprise rear landing gear, buoyancy systems, in particular inflatable systems, position or lighting lamps, and/or fuel tanks for feeding at least one engine of the aircraft with fuel.

Furthermore, such a sponson may also be used as a step, and it is consequently designed to enable a person to climb onto it, e.g. to facilitate maintenance of the aircraft.

Finally, a fuselage sponson also presents dimensional and shape characteristics that seek to optimize the aerodynamics of the aircraft, and in particular to limit the aerodynamic impact of the sponson. Sponson shapes are thus adapted to limit the increase in the aerodynamic drag coefficient caused by such a projection emerging from the main body of the fuselage, particularly since the surface area presented by the sponson for friction with air also generates an increase in drag.

In general manner, aircraft fitted with such fuselage sponsons may also have sliding side doors that are movable in translation so as to be opened, generally by being moved towards the rear along the main body of the fuselage. Under such circumstances, it can happen that there is interference between the sliding door and the fuselage sponson arranged longitudinally on a flank of the aircraft.

In order to mitigate that interference between the sponson and the sliding door, various solutions have been envisaged.

A first solution consists in making an opening in the bottom portion of the sliding door so as to avoid interference with the sponson when opening the door. In certain applications, that opening can then be covered with a flap portion of the door suitable for moving downwards and being pivotally mounted about an axis that is substantially horizontal. Such a flap portion of the door is thus distinct from a sliding portion of the door. An example of such a door with an opening is described in particular in Document U.S. Pat. No. 6,189,833.

Such a first solution to the problem of interference is nevertheless below optimum in terms of noise and temperature comfort for the occupants of the aircraft. Specifically, with a downwardly movable flap portion for the bottom of the door it is not possible to guarantee that the cabin is closed, at least when the opening in the bottom portion is not covered. Noise nuisance and temperature discomfort can then penetrate through that type of door with an opening in its bottom portion.

A second solution that has already been envisaged consists in making a notch in the sponson so as to allow the sliding door to pass freely between the main body of the fuselage and a portion of the sponson.

Under such circumstances, such a notch may present various shapes corresponding to various embodiments of this second solution. Thus, in one embodiment, the notch may extend vertically over the full height of the sponson.

Nevertheless, that embodiment is problematic since it leads to a large increase in aerodynamic drag for the aircraft. It therefore does not guarantee good aerodynamic characteristics for such a fuselage sponson.

In another embodiment, and by analogy, the notch may extend horizontally over the entire length of the sponson.

While the aircraft is in movement, a large amount of turbulence can then form in the air stream that is deflected by the sponson. Such turbulence is also highly problematic since it can interact dangerously with aerodynamic members at the rear of the aircraft. By way of example, such rear members may be formed by wings or ailerons, stabilizer surfaces, horizontal or vertical stabilizers, or blades of a tail rotor in the particular circumstance of a rotorcraft. Under certain circumstances, such an embodiment can thus lead to large losses of efficiency from the aerodynamic members at the rear of the aircraft, and it can thus be harmful to the aerodynamic characteristics of the aircraft and can affect the performance of the aircraft.

Finally, a last known solution consists in causing the sliding door to open longitudinally towards the front of the aircraft, or in other words in a direction going away from the sponson.

Although such an embodiment appears to satisfy aerodynamic and acoustic comfort constraints, it is nevertheless not compatible with all aircraft architectures. Specifically, certain aircraft do not have sufficient length to enable a sliding door to open forwards in that way. This applies in particular to aircraft that present a front door immediately in front of the sliding door for giving access to a cockpit of the aircraft.

BRIEF SUMMARY OF THE INVENTION

An object of the present invention is thus to propose an aircraft having a fuselage sponson and enabling the above-mentioned limitations to be overcome. Such a sponson also enables a sliding door of the aircraft to open towards the rear, while guaranteeing noise and temperature comfort inside the aircraft, and guaranteeing optimization concerning the resultant increase in aerodynamic drag or concerning interaction with aerodynamic members at the rear of the aircraft.

The invention thus provides an aircraft having a main body of a fuselage and at least one sliding side door suitable for moving in translation along a longitudinal direction D, the sliding side door being movable between a closed position arranged towards a front portion of the main body of said fuselage and an open position arranged towards a rear portion of the main body of the fuselage.

Such an aircraft also has at least one sponson emerging transversely from the main body of the fuselage and substantially perpendicularly relative to a vertical anteroposterior plane of symmetry P of the main body of the fuselage when the aircraft is standing on a horizontal support. Also, such a sponson includes a notch locally reducing a cross-section of the sponson in a connection zone of the sponson, the connection zone being arranged in the immediate proximity of the main body of the fuselage of the aircraft from which the sponson emerges transversely.

Such a notch is thus open at least to a front outside face and to a top outside face of the sponson enabling a bottom portion of a sliding side door to be received in its open position.

Such an aircraft is remarkable in that the notch in the sponson comprises:

a bottom inside face extending substantially horizontally when the aircraft is standing on a horizontal support and leading to the front outside face of the sponson;

a sloping inside face sloping towards the rear of the fuselage of the aircraft and extending between the bottom inside face and the top outside face of the sponson; and an internal partition arranged substantially parallel to the main body facing such an internal partition, the internal partition co-operating firstly with the bottom inside face and the sloping inside face and secondly with the front outside face and the top outside face of the sponson.

In other words, such an aircraft in accordance with the invention is provided with a sponson having a notch that extends only part of the way into the body of the sponson both vertically along an elevation axis Z when the aircraft is standing horizontally on the ground, and also longitudinally along a longitudinal axis X of a rectangular XYZ reference frame in which the XZ plane is parallel to the vertical anteroposterior plane of symmetry P of the main body of the fuselage of the aircraft. The axis X is thus parallel to the floor of the aircraft cabin, i.e. substantially parallel to the ground when the aircraft is standing on the ground, and perpendicular to the axis Z. Also, the longitudinal direction D for movement of the door in translation is substantially parallel to the axis X.

Furthermore, the transverse axis Y is perpendicular to the plane P. In accordance with the invention, the fuselage sponson then emerges from the main body of the fuselage in a transverse direction parallel to the axis Y.

The inside face sloping towards the rear then makes it possible to limit the impact of such a notch on the aerodynamic drag coefficient of the aircraft, i.e. along the axis X. It also makes it possible to avoid a puddle of rainwater forming or snow accumulating in the notch.

Furthermore, the inside faces and the internal partition of the notch form a closed fairing preventing an external air stream from penetrating into the inside of the internal volume defined by the fuselage sponson.

Advantageously, the sloping inside face may slope relative to the bottom inside face at a mean resulting angle $\alpha$ lying in the range 120° to 150° as measured in a plane substantially parallel to the vertical anteroposterior plane of symmetry P.

In other words, the sloped inside face co-operates with the bottom inside face to form an obtuse angle serving to limit any increase in the aerodynamic drag coefficient generated by the notch.

Also, if a longitudinal section of the bottom inside face is substantially rectilinear along the sliding direction of the door parallel to the axis X, a longitudinal section of the sloping inside face can present various shapes, corresponding to various alternatives for the sloping inside face, but without thereby going beyond the ambit of the invention.

The term "longitudinal section of the sloping inside face" is used to mean a section of the sloping inside face in a first section plane C1 substantially parallel to the longitudinal XZ plane. In other words, such a longitudinal section of a sloping inside face of the notch is a planar curve formed by the intersection between the section plane C1 and the sloping inside face of the notch.

Likewise, a longitudinal section of a bottom inside face of the notch is a planar curve formed by the intersection between the first section plane C1 and the bottom inside face of the notch.

Thus, in a first alternative, the sloping inside face of the notch may have a longitudinal section of a rectilinear shape.

Under such circumstances, the angle $\alpha$ is formed directly in the first section plane C1 by the angle between two directions, one defined by the longitudinal section of the bottom inside face and the other defined by the longitudinal section of the sloping inside face.

In a second alternative, the sloping inside face of the notch may have a longitudinal section of concave shape.

Under such circumstances, the angle $\alpha$ is formed in the section plane C1 by the angle between two directions, one defined by the longitudinal section of the bottom inside face and the other defined by a mean straight line of points defining the concave shape of the longitudinal section of the sloping inside face.

In a third alternative, the sloping inside face of the notch may have a longitudinal section of complex shape.

In particular, such a complex shape may include points of inflection, and for example it may present a sinusoidal shape. Like the second alternative, the angle $\alpha$ is formed in the first section plane C1 by the angle between two directions, one defined by the longitudinal section of the bottom inside face and the other defined by a mean straight line of points defining the complex shape of the longitudinal section of the sloping inside face.

In practice, the notch may present a depth b along a vertical axis Z that lies in the range 25% to 95% of the total height H along the axis Z of the sponson in another longitudinal section of the sponson, not including the notch.

This other longitudinal section relating to the sponson and not including the notch is thus a plane surface formed by the intersection between the sponson and a second section plane C2 parallel to the first section plane C1. Such a second section plane C2 is also spaced apart from the first section plane C1 by a value such that the second section plane C2 lies outside the notch.

Furthermore, such a depth of the notch is measured along a direction that is substantially vertical and defined by the axis Z of the rectangular XYZ reference frame. Such a value for the depth of the notch then also makes it possible to contribute to reducing the impact of the presence of a notch on the aerodynamic drag coefficient of the aircraft along the axis X. Typically, a depth corresponding to 80% of the total height H of the sponson makes it possible to optimize this increase in the drag coefficient.

Advantageously, at least in the front outside face of the sponson, the notch may present a width along the transverse axis Y that lies in the range 100 millimeters (mm) to 350 mm. As mentioned above, such an axis Y is perpendicular to the vertical anteroposterior plane of symmetry P of the main body of the fuselage.

This width for the notch is then arranged substantially horizontally when the aircraft is standing on a horizontal support, and it is wide enough to enable it to act as a step. The notch can thus enable a person to stand one or two feet thereon in order to perform maintenance operations on a high portion of the aircraft.

Furthermore, various junction shapes may be used for connecting together the bottom inside face of the notch and the sloping inside face of the notch.

Thus, in a first example, a junction between the bottom inside face of the notch and the sloping inside face of the notch may include a connection fillet.

In other words, such a connection fillet forms a concave face that is tangential to at least one of the two faces defined by the bottom inside face and the sloping inside face.

In a second example, a junction between the bottom inside face of the notch and the sloping inside face of the notch may include a connection edge.

Under such circumstances, the connection edge is formed directly by the intersection between the two faces defined by the bottom inside face and the sloping inside face.

Also, various junction shapes may likewise be used for connecting together the bottom inside face of the notch and the top outside face of the sponson.

Thus, in a first a variant, a junction between the sloping inside face of the notch and the top outside face of the sponson may include a rounded connection tangent.

In other words, and as for the connection fillet, such a rounded connection tangent forms a convex face that is tangential to at least one of the two faces defined by the sloping inside face of the notch and the top outside face of the sponson.

In a second variant, a junction between the sloping inside face of the notch and the top outside face of the sponson may include a connection edge.

Under such circumstances, the connection edge is formed directly by the intersection between the two faces defined by the sloping inside face of the notch and the top outside face of the sponson.

BRIEF DESCRIPTION OF THE SEVERAL VIEWS OF THE DRAWINGS

The invention and its advantages appear in greater detail in the context of the following description of embodiments given by way of nonlimiting illustration with reference to the accompanying figures, in which:

FIG. 3 is a face view of a fuselage sponson in accordance with the invention; and FIGS. 4 to 6 show three embodiments of fuselage sponsons in accordance with the invention.

Elements that are present in more than one of the figures are given the same references in each of them.

DETAILED DESCRIPTION OF THE INVENTION

It should be observed that three mutually orthogonal axes x, y, and Z are shown in FIGS. 1 to 6.

The axis X is said to be longitudinal in so far as it extends between the front and rear ends of the aircraft. The term "length" is used relative to a longitudinal dimension of the aircraft along this longitudinal axis X.

An axis Y is said to be transverse. The term "width" relates to a transverse dimension of the aircraft along this transverse direction.

Finally, a third axis Z is said to be in "elevation" and corresponds to the height dimensions of the structures described. The term "height" thus relates to a dimension in elevation of the aircraft along said elevation axis. The axis Z is substantially vertical when the aircraft is standing on substantially horizontal ground.

Figure 1:
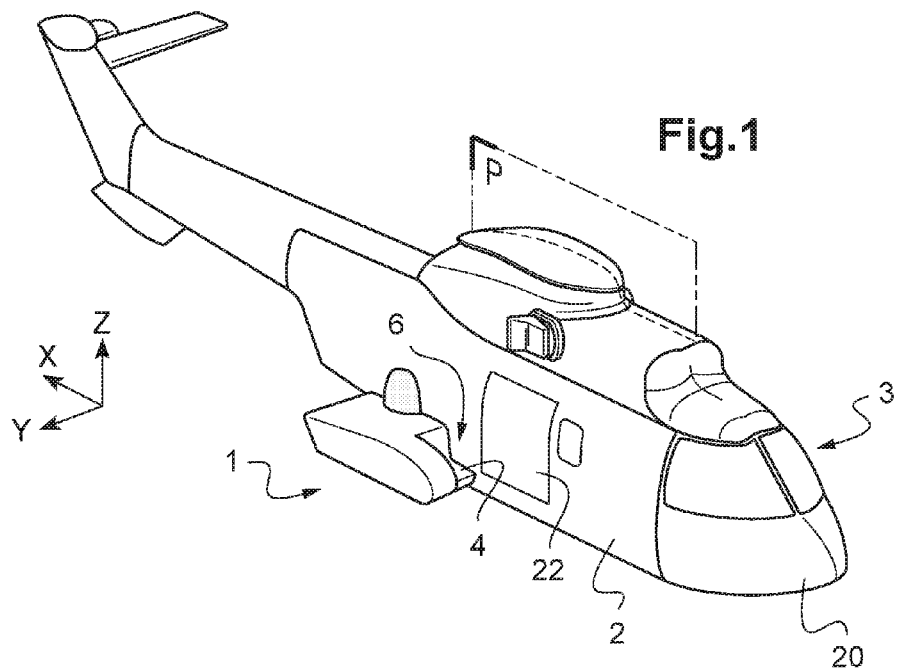
FIG. 1 shows a perspective view of an aircraft in accordance with the invention.

As shown in FIG. 1, the aircraft 20 comprises a main body 2 of a fuselage 3 with an anteroposterior plane of symmetry P defined by the axes X and Z. Such a plane P is thus vertical when the aircraft is arranged on a horizontal support.

Furthermore, such an aircraft 20 includes at least one sponson 1 of the fuselage 3 emerging transversely from the main body 2 of the fuselage 3 along the axis Y. Such a sponson 1 also has a connection zone 6 enabling it to be secured to the main body 2 of the fuselage 3, and a notch 4 for positioning a sliding door 22 relative to the sponson 1.

Figure 2:
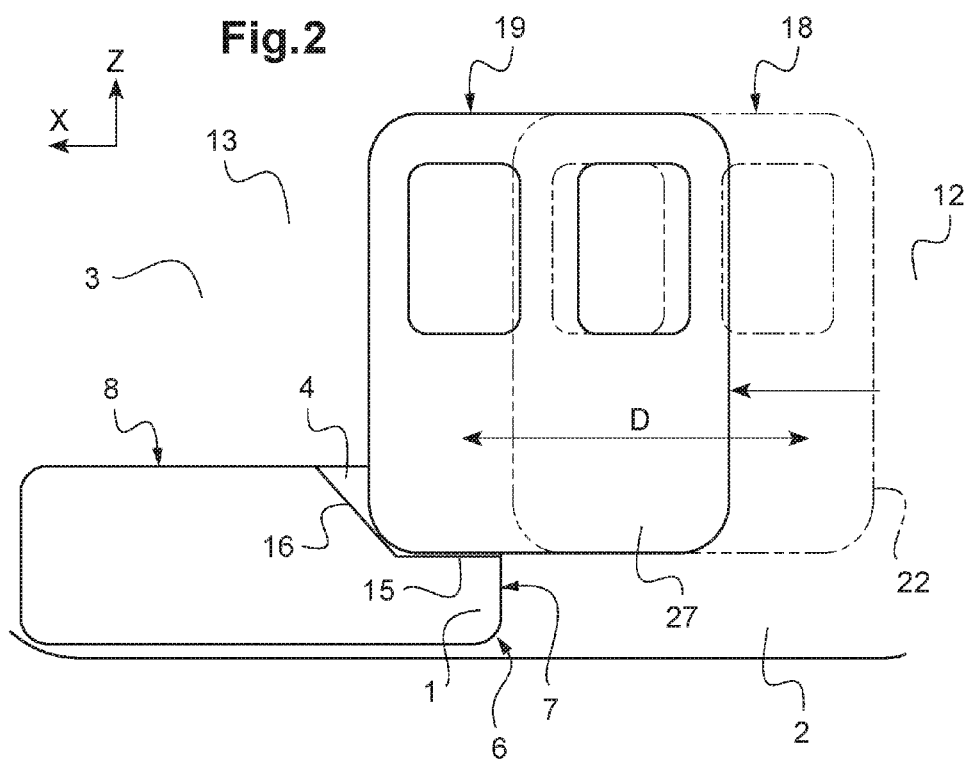
FIG. 2 is a side view in section of a fuselage sponson in accordance with the invention.

Specifically, and as shown in FIG. 2, the sliding door 22 can move in translation along a longitudinal direction D that is substantially parallel to the axis X. This movement in translation takes place between a closed position 18 of the sliding door 22 and an open position 19 of the sliding door 22. Furthermore, the closed position 18 is arranged in a front portion 12 of the main body 2, and the open position 19 is arranged in a rear portion 13 of the main body 2.

Thus, when the sliding door 22 is in the open position 19, a bottom portion 27 of the door is received in the notch 4 in the sponson 1. Such a notch then has a bottom inside face 15 facing substantially parallel to the axis X and leading to a front outside face 7 of the sponson 1.

Such a notch 4 also has a sloping inside face 16 rising towards the rear portion 13 of the main body 2. This sloping inside face 16 extends between the bottom inside face 15 and a top outside face 8 of the sponson 1.

In addition, and as shown in FIG. 3, the notch 4 also has an internal partition 17 forming a fairing to avoid outside air penetrating into the inside volume defined by the sponson 1. Such an internal partition 17 that extends both between the two inside faces 15 and 16 of the notch 4 and between the front and top faces 7 and 8 of the sponson 1.

Furthermore, at least at the front outside face 7 of the sponson 1, such a notch 4 presents a width l along the axis Y lying in the range 100 mm to 350 mm, e.g. being equal to 170 mm. Having such a width for the notch 4 then enables the sponson 1 to act as a step for facilitating maintenance operations on the aircraft 20.

Also, section planes C1 and C2 that are parallel to the XZ plane are shown in FIG. 3. A first section plane C1 passes through the notch 4 of the sponson 1, while a second section plane C2 does not pass through the notch 4.

Furthermore, and as shown in FIGS. 4 to 6, various embodiments of sponsons 11, 21, 31 are envisaged representing three combinations combining three alternative shapes for the lateral inside faces 16, 26, 36, first and second examples of junctions 30, 40, 41 between the bottom inside face 15, 25, 35 and the sloping inside face 16, 26, 36, and first and second variants of junctions 37, 45, 47 between the sloping inside face 16, 26, 36 and the top outside face 8.

Naturally, the invention is not limited to these three combinations that are given by way of nonlimiting indication. The invention thus also applies to any other combination of the three alternative shapes for the lateral inside faces 16, 26, 36, the two example junctions 30, 40, 41 between the bottom inside face 15, 25, 35 and the sloping inside face 16, 26, 36, and the two variant junctions 37, 45, 47 between the sloping inside face 16, 26, 36 and the top outside face 8.

Thus, in a first embodiment of the sponson 11 as shown in the first section plane C1 in FIG. 4, the sloping inside face 16 of the notch 14 has a longitudinal section of rectilinear shape in accordance with a first alternative for the shape of the sloping inside face 16. Its angle of inclination a relative to the bottom inside face 15 is thus formed directly by the angular difference between these two faces 15 and 16.

Furthermore, a junction 30 between the bottom inside face 15 and the sloping inside face 16 is shown in this example in the form of a connection edge 32 in accordance with the second example junction 30 between the bottom inside face 15 and the sloping inside face 16. Likewise, a junction 37 between the sloping inside face 16 and the top outside face 8 of the sponson 11 is shown in the form of a connection edge 38 in accordance with the second variant junction 37 between the sloping inside face 16 and the top outside face 8.

In a second embodiment of the sponson 21 as shown in the first section plane C1 in FIG. 5, the sloping inside face 26 of the notch 24 has a longitudinal section of concave shape, in accordance with a second alternative for the shape of the sloping inside face 26, which concave shape may be parabolic for example. The angle of inclination a of the sloping inside face 26 relative to the bottom inside face 25 is thus formed by the angular difference between the bottom inside face 25 and the rectilinear direction corresponding to the mean of the points of the sloping inside face 26.

Furthermore, a junction 40 between the bottom inside face 25 and the sloping inside face 26 is shown in this example in the form of a connection fillet 42 in accordance with the first example junction 40 between the bottom inside face 25 and the sloping inside face 26. A junction 47 between the sloping inside face 26 and the top outside face 8 of the sponson 21 is shown in the form of a connection edge 38 in accordance with the second variant junction 47 between the sloping inside face 26 and the top outside face 8.

Finally, in a third embodiment of the sponson 31 as shown in the first section plane C1 in FIG. 6, the sloping inside face 36 of the notch 34 has a longitudinal section of complex shape in accordance with a third alternative for the shape of the sloping inside face 36. By way of example, such a complex shape may be sinusoidal. As in the second embodiment of the sponson 21, in this configuration, the angle of inclination a of the sloping inside face 36 relative to the bottom inside face 35 is thus formed by the angular difference between the bottom inside face 35 and the rectilinear direction corresponding to the mean of the points of the sloping inside face 36.

Furthermore, a junction 41 between the bottom inside face 35 and the sloping inside face 36 is shown in this example in the form of a connection fillet 43 in accordance with the first example junction 41 between the bottom inside face 35 and the sloping inside face 36. Likewise, a junction 45 between the sloping inside face 36 and the top outside face 8 of the sponson 31 is shown in the form of a rounded connection tangent 46 in accordance with the first variant junction 45 between the sloping inside face 36 and the top outside face 8.

In addition, and as shown in the three sponson embodiments 11, 21, 31, the depth b along the axis Z of the notch 14, 34, 34 is advantageously selected to be substantially equal to 80% of the total height H of the sponson 11, 21, 31 as measured in the second section plane C2.

Naturally, the present invention may be subjected to numerous variations as to its implementation. Although several embodiments are described, it should readily be understood that it is not conceivable to identify exhaustively all possible embodiments. It is naturally possible to envisage replacing any of the means described by equivalent means without going beyond the ambit of the present invention.

What is claimed is:

1. An aircraft comprising:
  a main body of a fuselage;
  at least one sliding side door suitable for moving in translation along a longitudinal direction, the sliding side door being movable between a closed position arranged towards a front portion of the main body of the fuselage and an open position arranged towards a rear portion of the main body of the fuselage;
  at least one sponson emerging transversely from the main body of the fuselage substantially perpendicularly relative to a vertical anteroposterior plane of symmetry of the main body of the fuselage when the aircraft is standing on a horizontal support, the at least one sponson including a notch locally reducing a cross-section of the at least one sponson in a connection zone of the at least one sponson, the connection zone being arranged in the immediate proximity of the main body of the fuselage of the aircraft from which the at least one sponson emerges transversely, the notch being open at least to a front outside face and to a top outside face of the at least one sponson, and serving to receive a bottom portion of the sliding side door when arranged in its open position;
  wherein the notch of the at least one sponson comprises:
    a bottom inside face extending substantially horizontally when the aircraft is standing on a horizontal support and leading to the front outside face of the at least one sponson;
    a sloping inside face sloping towards the rear of the fuselage of the aircraft and extending between the bottom inside face and the top outside face of the at least one sponson; and
    an internal partition arranged substantially parallel to the main body facing the internal partition, the internal partition co-operating firstly with the bottom inside face and the sloping inside face and secondly with the front outside face and the top outside face of the at least one sponson.

2. An aircraft according to claim 1, wherein the sloping inside face slopes relative to the bottom inside face at a mean resulting angle lying in the range 120° to 150° as measured in a plane substantially parallel to the vertical anteroposterior plane of symmetry.

3. An aircraft according to claim 1, wherein the sloping inside face of the notch has a longitudinal section that is rectilinear in shape.

4. An aircraft according to claim 1, wherein the sloping inside face of the notch has a longitudinal section that is concave in shape.

5. An aircraft according to claim 1, wherein the sloping inside face of the notch has a longitudinal section that is complex in shape.

6. An aircraft according to claim 1, wherein the notch presents a depth along a vertical axis that lies in the range 25% to 95% of the total height along the vertical axis of the at least one sponson on another longitudinal section of the at least one sponson not including the notch.

7. An aircraft according to claim 1, wherein the notch presents, at least at the front outside face of the at least one sponson, a width along a transverse axis and lying in the range 100 mm to 350 mm.

8. An aircraft according to claim 1, wherein a junction between the bottom inside face of the notch and the sloping inside face of the notch includes a connection fillet.

9. An aircraft according to claim 1, wherein a junction between the bottom inside face of the notch and the sloping inside face of the notch includes a connection edge.

10. An aircraft according to claim 1, wherein a junction between the sloping inside face of the notch and the top outside face of the at least one sponson includes a rounded connection tangent.

11. An aircraft according to claim 1, wherein a junction between the sloping inside face of the notch and the top outside face of the at least one sponson includes a connection edge.

* * * * *